United States Patent
Li et al.

(10) Patent No.: US 10,338,547 B2
(45) Date of Patent: Jul. 2, 2019

(54) SYSTEM, METHOD AND APPARATUSES FOR DETERMINING PARAMETER SETTINGS FOR A POWER GENERATION SYSTEM AND A TANGIBLE COMPUTER READABLE MEDIUM

(71) Applicant: Accenture Global Services Limited, Dublin (IE)

(72) Inventors: Ming Li, Beijing (CN); Fang Hou, Beijing (CN); Qin Zhou, Beijing (CN); Hui Shen, Beijing (CN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 188 days.

(21) Appl. No.: 15/329,981

(22) PCT Filed: Aug. 1, 2014

(86) PCT No.: PCT/CN2014/083572
§ 371 (c)(1),
(2) Date: Jan. 27, 2017

(87) PCT Pub. No.: WO2016/015341
PCT Pub. Date: Feb. 4, 2016

(65) Prior Publication Data
US 2017/0261952 A1    Sep. 14, 2017

(51) Int. Cl.
*F23N 5/00* (2006.01)
*G05B 15/02* (2006.01)
*F01K 13/02* (2006.01)

(52) U.S. Cl.
CPC ............. *G05B 15/02* (2013.01); *F01K 13/02* (2013.01); *F23N 5/00* (2013.01)

(58) Field of Classification Search
CPC ............ G05B 15/02; F01K 13/02; F23N 5/00
See application file for complete search history.

(56) References Cited

U.S. PATENT DOCUMENTS

| 5,970,426 A | 10/1999 | Mandel et al. |
| 7,385,300 B2 | 6/2008 | Huff et al. |

(Continued)

FOREIGN PATENT DOCUMENTS

| CN | 101771274 A | 7/2010 |
| EP | 1 693 558 A1 | 8/2006 |

OTHER PUBLICATIONS

International Search Report and Written Opinion, dated May 28, 2015, pp. 1-11, issued in International Application No. PCT/CN2014/083572, State Intellectual Property Office of the P.R. China, Beijing, China.

(Continued)

*Primary Examiner* — Carlos R Ortiz Rodriguez
(74) *Attorney, Agent, or Firm* — Brinks Gilson & Lione

(57) ABSTRACT

The present disclosure relates to system, method and apparatuses for determining parameter settings for a power generation system and a tangible computer readable medium therefor. In an embodiment of the present disclosure, the system comprises at least one processor; and at least one memory storing computer executable instructions. The at least one memory and the computer executable instructions are configured to, with the at least one processor, cause the system to: divide historical power related data of the power generation system into a plurality of power load segments based on typical power load values and the number of the historical power related data; identify feasible parameter ranges for each of the plurality of power load segments; and determine optimal parameter settings for each of the plurality of power load segments, based on the identified feasible parameters ranges and correlations between system energy efficiency and relative parameters of each of the plurality of power load segments. The embodiments of the present disclosure provide a highly adaptive solution for determining optimal parameter settings instead of an equipment (Continued)

specific solution and it can be applied to different power generation systems, especially coal-fired power plant, as well as different operation conditions.

16 Claims, 7 Drawing Sheets

(56) References Cited

U.S. PATENT DOCUMENTS

2002/0065581 A1  5/2002  Fasca
2009/0125155 A1  5/2009  Hill et al.

OTHER PUBLICATIONS

Extended European Search Report, dated Jun. 1, 2018, pp. 1-8, issued in European Patent Application No. 14898611.0, European Patent Office, Munich, Germany.

SYSTEM, METHOD AND APPARATUSES FOR DETERMINING PARAMETER SETTINGS FOR A POWER GENERATION SYSTEM AND A TANGIBLE COMPUTER READABLE MEDIUM

TECHNICAL FIELD

Embodiments of the present disclosure relate to the field of power generation technology and more particularly to system, method, and apparatuses of determining parameter settings for a power generation system, especially a coal-fired power plant, and a tangible computer readable medium therefor.

BACKGROUND

As one of the biggest energy sources for power generation, coal has been widely used in power generation. In a coal-fired power generation system, energy efficiency is increasingly focused on due to the fact that the power plant economics and coal cost/emission are closely related to energy efficiency.

However, many coal-fired power generation systems lack effective energy efficiency program. In an existing coal-fired power plant, the power generation system usually includes a variety of equipment types with various operation conditions. Thus, a traditional mechanism energy efficiency module is often specific to a certain equipment type, which means they are not adaptive and comprehensive. Besides, in some of the power generation systems, equipment parameters provided by equipment manufacturers are inadequate or outdated for developing a mechanism module. In addition, the mechanism energy efficiency module is usually established for rated operation conditions, and the efficiency will be significantly affected if the power generation is not operated under rated operation conditions, or in other words, the accuracy will be compromised when the power generation system is operated at lower loading levels.

Therefore, there is a need in the art for a solution for improving energy efficiency in a power generation system, especially in a coal-fired power generation system.

SUMMARY OF THE DISCLOSURE

To this end, according to a first aspect of the present disclosure, there is provided a system for determining parameter settings for a power generation system. The system comprises at least one processor; and at least one memory storing computer executable instructions, wherein the at least one memory and the computer executable instructions configured to, with the at least one processor, cause the system to: divide historical power related data of the power generation system into a plurality of power load segments based on typical power load values and the number of the historical power related data; identify feasible parameter ranges for each of the plurality of power load segments; and determine optimal parameter settings for each of the plurality of power load segments, based on the identified feasible parameters ranges and correlations between system energy efficiency and relative parameters of each of the plurality of power load segments.

In an embodiment of the present disclosure, the system may be further configured to shift the power load segments by shifting segment boundary of the power load segments by a predetermined number, and perform the identifying feasible parameter ranges and the determining the optimal parameters settings for each of the shifted power load segments.

In another embodiment of the present disclosure, the system may be further configured to form an optimal parameter setting curve for each of the parameters based on the determined optimal parameter settings for each of the plurality of power load segments by means of interpolation.

In a further embodiment of the present disclosure, the dividing historical power related data into a plurality of power load segments may comprise setting segment boundaries based on typical power load values and the number of the historical power related data; and identifying, from the historical power related data, power related data within segment boundaries of the plurality of power load segments, respectively.

In a still further embodiment of the present disclosure, each of the feasible parameter ranges may be determined as between a value corresponding to a predetermined lower percentile rank in power related data of respective power load segments and a value corresponding to a predetermined higher percentile rank in power related data of respective power load segments.

In a yet further embodiment of the present disclosure, the correlation between relative parameters and system energy efficiency may be found by, establishing, for each of the plurality of the power load segments, a linear regression module between the system energy efficiency and the relative parameters; and determining regression coefficients of the linear regression module based on the power related data of the each of the plurality of power load segments, wherein the regression coefficients indicate the effect of relative parameters on the system energy efficiency.

In a still yet further embodiment of the present disclosure the system may be further configured to pre-process power related records from various data sources to obtain the historical power related data used for segmentation.

According to a second aspect of the present disclosure, there is provided a method for determining parameter settings for a power generation system. The method comprises: dividing historical power related data of the power generation system into a plurality of power load segments based on typical power load values and the number of the historical power related data; identifying feasible parameter ranges for each of the plurality of power load segments; and determining optimal parameter settings for each of the plurality of power load segments, based on the identified feasible parameters ranges and correlations between system energy efficiency and relative parameters of each of the plurality of power load segments.

According to a third aspect of the present disclosure, there is provided an apparatus for determining parameter settings for a power generation system. The apparatus comprises: a data segmentation module configured to divide historical power related data of the power generation system into a plurality of power load segments based on typical power load values and the number of the historical power related data; a range identification module configured to identify feasible parameter ranges for each of the plurality of power load segments; and a parameter determination module configured to determine optimal parameter settings for each of the plurality of power load segments, based on the identified feasible parameters ranges and correlations between system energy efficiency and relative parameters of each of the plurality of power load segments.

According to a fourth aspect of the present disclosure, there is provided another apparatus for determining parameter settings for a power generation system. The apparatus comprises means for dividing historical power related data of the power generation system into a plurality of power load segments based on typical power load values and the number of the historical power related data; means for feasible parameter ranges for each of the plurality of power load segments; and means for determining optimal parameter settings for each of the plurality of power load segments, based on the identified feasible parameters ranges and correlations between system energy efficiency and relative parameters of each of the plurality of power load segments.

According to a fifth aspect of the present disclosure, there is provided a tangible computer-readable medium having a plurality of instructions executable by a processor to determine parameter settings for a power generation system. The tangible computer-readable medium may comprise instructions configured to perform steps of the method according to the second aspect of present disclosure.

With embodiments of the present disclosure, optimal parameter settings may be determined automatically from historical power related data and thus it could provide a more adaptive solution for determining parameter settings instead of an equipment specific solution, and it can be applied to various power generation systems, especially a coal-fired power plant, as well as different load conditions.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein.

DETAILED DESCRIPTION OF EMBODIMENTS

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced herein. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

As mentioned before, the existing mechanism energy efficiency module is limited by various factors such as equipment types, parameter accuracy, loading levels, etc. and thus it cannot provide effective energy efficiency in many real scenarios. Hence, in the present disclosure, a solution for determining parameter settings for a power generation system, especially a coal-fired power plant, is proposed to improve energy efficiency of the power plant system.

Hereinafter, a method for determining parameter settings for a power generation system as proposed in the present disclosure will be described first with reference to FIG. 1, which schematically illustrates a flow chart of a method for determining parameter settings for a power generation system according to an embodiment of the present disclosure.

Figure 1:
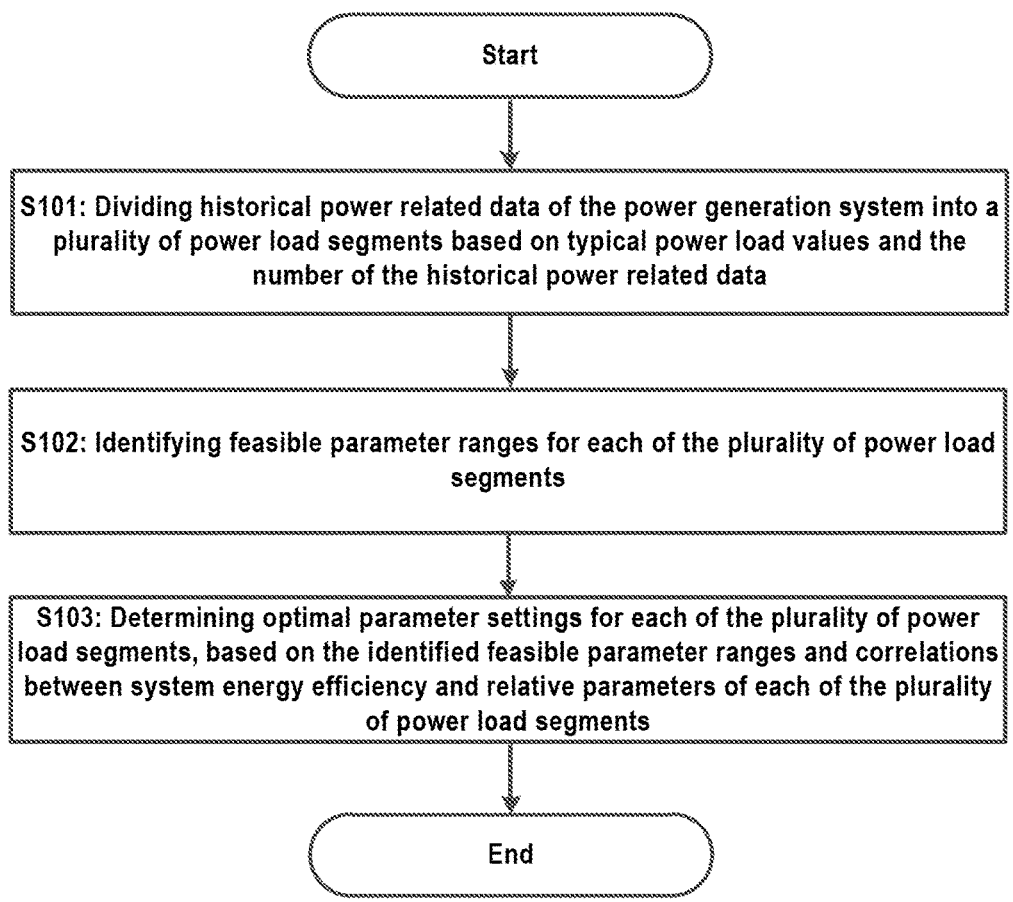
FIG. 1 schematically illustrates a flow chart of a method of determining parameter settings for a power generation system according to an embodiment of the present disclosure.

As illustrated in FIG. 1, at step S101, historical power related data of the power generation system are divided into a plurality of power load segments based on typical power load values and the number of the historical power related data.

The historical power related data may be online monitoring data or records from power plant record or database. In an embodiment of the present disclosure, the historical power related data may include for example records of parameter which can be adjusted during operation, records related to optimization targets such as electricity used in power generation, coal consumption, heat consumption, emission measurements, etc.

These power related data may be obtained from different data sources (for example database of different monitoring systems), and as such, these power related data might have different formats, different units and different time granularities. Thus, it will be preferably to pre-process these power related records to obtain the historical power related data used for segmentation in the present disclosure. For example, format conversion and cleaning may be performed on these power related data to obtain clean power related data with unified formats. Besides, if these power related data are recorded on different time intervals, it may set a proper record interval (for example, hour/shift/day) and then normalize and merge these data accordingly. Bad points or noisy records may be filtered out by checking data quality to remove noise points in these power related data. These power related data may be further classified to match changes in target external conditions, e.g., change in seasons.

Next, the obtained historical power related data may be split into a plurality of subsets, or a plurality of power load segments. The power generation system, especially the coal-fired power generation system usually have complex, non-linear characteristic, as such, it is difficult to find a statistical module suitable for all types of equipment at various operation conditions. Thus, in embodiments of the present disclosure, the inventors propose to split the power related data into a plurality of power load segments; in such a way, a complex process can be modeled with a plurality of simple modules built from respective segments.

The historical power related data of the power generation system may be divided into a plurality of power load segments, for example, based on typical power load values and the number of the historical power related data. In an embodiment of the present disclosure, segment boundaries are first set based on typical power load values and the number of the historical power related data. The boundaries may be determined based on various approach, for example with the help of the histogram of power load values in record data, which will be elaborated with reference to FIGS. 2A and 2B.

Figure 2A:
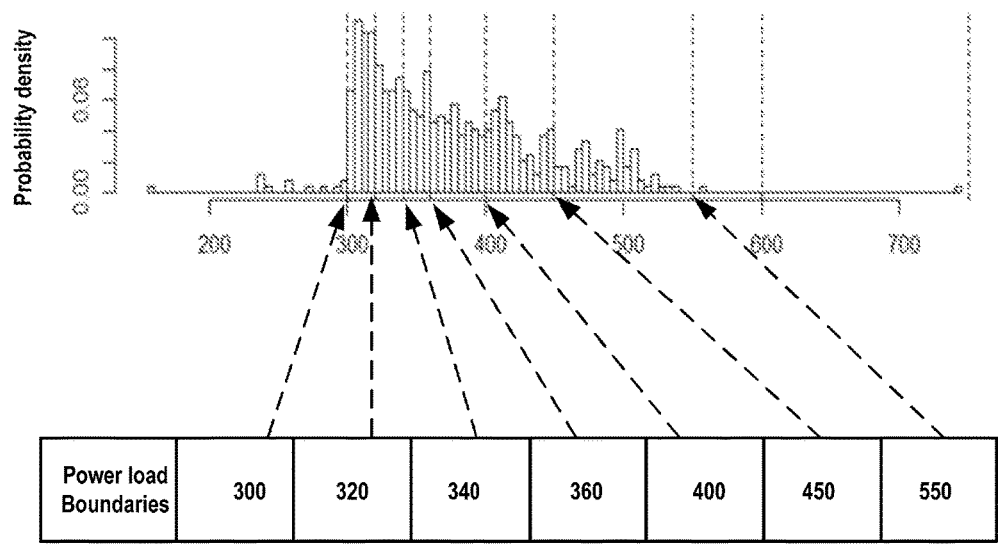
FIGS. 2A and 2B schematically illustrate a diagram of dividing power related data according to an embodiment of the present disclosure.

As illustrated in FIG. 2A, a histogram of power load values is presented, based on the probability density of the power related records and typical power load values, for example, seven segment boundaries are determined, i.e., 300 MW, 320 MW, 340 MW, 360 MW, 400 MW, 450 MW and 550 MW. From FIG. 2A, it is clear that these segment boundaries are selected based on typical power load values and the probability density of the power related records. The typical power load values as illustrated are from 300 MW to 550 MW, beyond which there are few records. In addition, it is also clear that the higher the probability density in a power load ranges is, the more segment boundaries will be determined, so that each power load segment will include approximately same number of power related data. For example, for power load range between 300 MW to 400 MW, there are determined three segment boundaries, 320 MW, 340 MW, 360 MW, while for a power load range of 400 to 550 MW, there is only one segment boundary, 450 MW.

In the example as illustrated in FIG. 2A, based on the segment boundaries, six power load segments may be obtained as follows Segment 1: [300, 320),
Segment 2: [320, 340),
Segment 3: [340, 360),
Segment 4: [360, 400),
Segment 5: [400, 450) and
Segment 6: [450, 550].

Figure 2B:
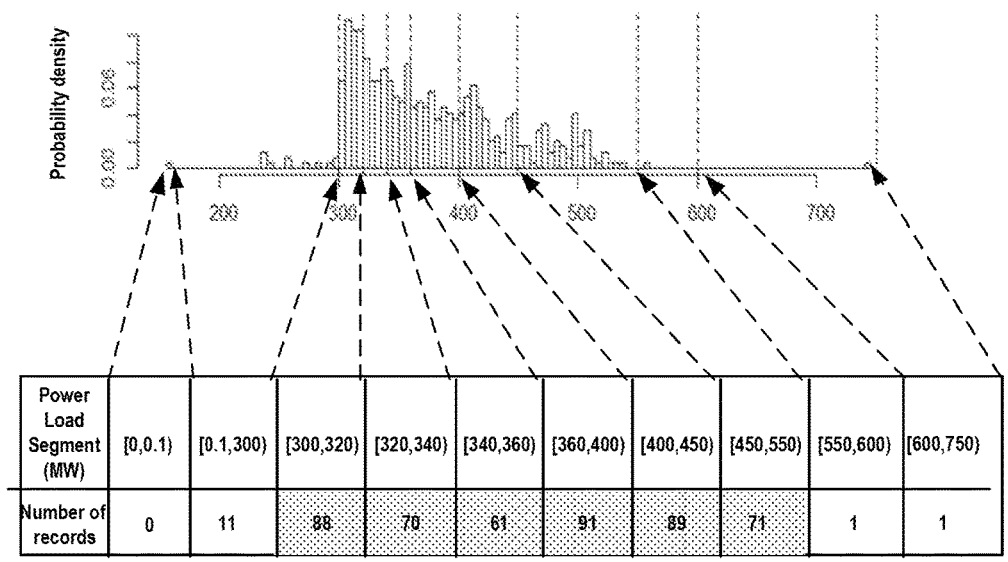

Then, power related data within segment boundaries of respective segmentation may be identified. This may be implemented by simply comparing a power load value with both segment boundaries of each of segments. FIG. 2B, illustrates the identifying of the power related data within segment boundaries of respective segmentations, wherein in the six power load segments, segments 1 to 6, there are 88, 70, 61, 91, 89 and 71 records respectively. From FIG. 2B, it may be seen that segmentation is performed on power load range wherein there are enough data records and power load ranges containing few records, such as those ranges from 0 MW to 300 MW and from 550 to 750 MW, may be ignored since there are few data records and the power generation system usually are not operated under such a power load. In such way, power related data in each segment can be obtained, which means now it may clearly know which power load segment includes which power related data.

However, it should be understood that the approaches of determining segment boundaries and identifying power related data belong to respective segmentation, the boundary points and the number of segment boundaries are given only for a purpose of illustration, and any suitable approaches for performing the segmentation and any number of segment boundaries and boundary points may also be possible which are dependent on specific cases of power generation system.

Next, at step S102, feasible parameter ranges for each of the plurality of power load segments are identified. In an embodiment of the present disclosure, each of the feasible parameter ranges may be determined as between a value corresponding to a predetermined lower percentile rank in power related data of respective power load segments and a value corresponding to a predetermined higher percentile rank in power related data of respective power load segments.

First, the higher and lower percentile ranks for the feasible parameter ranges may be set. For example, the higher percentile may be set as 75% and the lower percentile may be set as 25%. It should be appreciated that the 75% and 25% are only given for a purpose of illustration, and any other suitable percentiles may also be used. It may also be appreciated that the higher and lower percentile ranks may be predetermined by the customer and on the other hand, they may also be fixed parameters.

Figure 3:
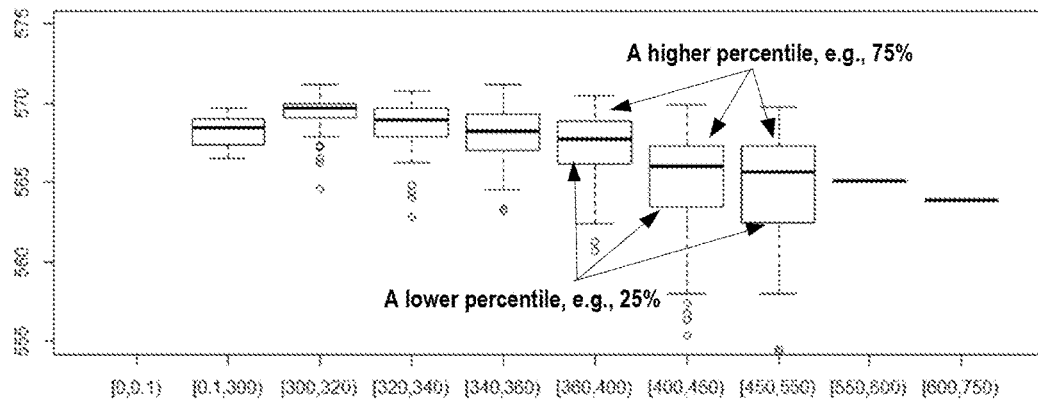
FIG. 3 schematically illustrates a diagram of feasible parameter range identification according to an embodiment of the present disclosure.

Then, for a power load segment, all power related data values belonging to this power load segment are sorted by their magnitude, for example, in an ascending order. Then, the power data corresponding to the set higher percentile and lower percentile may be determined, i.e., 75% and 25% respectively, from the ordered power data. The values corresponding to the two found power data may be taken as the upper and lower limits of the power load segment, which is schematically illustrated in FIG. 3, in which the rectangular block indicates the feasible parameter ranges and the bold lines indicate the medians of the parameter values.

Taking a power load segment containing 100 records as an example, values of the power related data ranking twenty-fifth (=100*25%) and ranking seventy-fifth (=100*75%) respectively may be considered as the lower and upper limits of the power load segment; while for a power load segment containing, for example, 88 records (segment 1), values of the power related data ranking twenty-two (=88*25%) and ranking seventy-fifth (=88*75%) respectively may be considered as the lower and upper limits. By means of parameter range identification, feasible parameter range for each power load segment can be obtained. Only for a purpose of illustration, an example of feasible parameter ranges identified from the parameter range identification is given in Table 1.

TABLE 1

Feasible Parameter Ranges for Different Power Load Levels

| Power Load level | Percentile rank | Percentile of Adjustable Parameters | | | | | | |
|---|---|---|---|---|---|---|---|---|
| | | Oxygen | Main Steam Temperature | Main Steam Pressure | Reheat Steam Temperature | Reheat Steam Pressure | Vacuum | ... |
| 300 MW~320 MW | $25^{th}$ | 6.68842 | 569.075 | 15.075 | 560.375 | 2 | −94.8 | ... |
| | $75^{th}$ | 13.9857 | 570 | 15.4 | 564.025 | 2 | −93.3 | ... |
| 320 MW~340 MW | $25^{th}$ | 6.31647 | 567.925 | 15.7 | 559.425 | 2 | −94.975 | ... |
| | $75^{th}$ | 13.409 | 569.7 | 16.1 | 562.375 | 2.1 | −93.625 | ... |
| ... | ... | ... | ... | ... | ... | ... | ... | ... |

Afterwards, at step S103, optimal parameter settings for each of the power load segment are determined based on the feasible parameters ranges identified at step S702 and correlations between system energy efficiency and relative parameters of each of the plurality of power load segments.

The correlations between system energy efficiency and relative parameters of each of the plurality of power load segments may be found by various means, and only for a purpose of illustration, a linear regression model based approach will be described in detail.

For example, a linear regression model may be first established for each of power load segments. Particularly, an optimization target, such as standard coal consumption rate, emission measurements, etc., may be selected as an optimization target and assigned as a dependent variable y, and related adjustable parameters may be assigned as independent variables $x_i$. By means of linear regression model, it may get the correlation between adjustable parameter $x_i$ and optimization target y as follows:

$$y=\beta_1 x_1+\beta_2 x_2+\ldots+\beta_n x_n, \; i=1,\ldots,n, \quad (1)$$

Based on values of the power related records belonging to each power load segment, regression coefficients $\beta_i$ may be obtained by solving equation (1), which regression coefficients indicate effect of respective parameters on the target energy efficiency.

For example, a higher absolute value of coefficient $\beta_i$ indicates the parameter $x_i$ has higher correlation with the optimization target, which means the adjustment of the parameter $x_i$ by a same absolute value will affect the optimization target greatly. On the other hand, a lower absolute value of coefficient $\beta_i$ indicates the parameter $x_i$ has lower correlation with the optimization target, which means the adjustment of the parameter by a same absolute value will have a less effect on the optimization target. Alternatively, before establishing the linear regression model, the records may be normalized as, for example, $(x_i-\min(x))/(\max(x)-\min(x))$. Then in such a case, the coefficient $\beta_i$ will indicate the degree that the adjustment of the parameter $x_i$ by the same percentage will affect the optimization target.

In addition, a positive value of coefficient $\beta_i$ indicates a positive correlation therebetween; and a negative value of coefficient $\beta_i$ indicates a negative correlation. For example, if it is to maximize the optimization target, then the higher value of the parameter will help to improve the optimization target if the coefficient $\beta_i$ indicates a positive correlation; while a lower value of the parameter will help if the coefficient $\beta_i$ indicates a negative correlation. On the other hand, if it is to minimize the optimization target, then the lower value of the parameter will help to improve the optimization target if the coefficient $\beta_i$ indicates a positive correlation while a higher value of the parameter will help if the coefficient $\beta_i$ indicates a negative correlation.

Only for a purpose of illustration, example coefficients of adjustment parameters according to an embodiment of the present disclosure are given in Table 2 with a target of minimizing consumption rate.

TABLE 2

Regression Coefficients of Adjustable Parameters

| Power Load Segment | Coefficients of Adjustable Parameters | | | | | | |
|---|---|---|---|---|---|---|---|
| | Oxygen | Main Steam Temperature | Main Steam Pressure | Reheat Steam Temperature | Reheat Steam Pressure | Vacuum | ... |
| 300 MW~320 MW | 10.86975 | 5.680911 | 61.47336 | −2.35127 | −450.905 | 19.27655 | ... |
| 320 MW~340 MW | 2.636318 | 17.43354 | −31.7927 | 4.697892 | 63.01041 | 4.934398 | ... |
| ... | ... | ... | ... | ... | ... | ... | ... |

From Table 2, it can be seen that for different power load segments, regression coefficients may have different values. Based on these regression coefficients, the optimal parameter setting for each parameter may be determined.

For example, it may be assumed that the optimization target is coal consumption rate, and it is desirable to minimize the value of the coal consumption rate. Accordingly, if the coefficient $\beta_i$ is a positive value, the value corresponding to the lower limit of the feasible parameter range is taken as the optimal parameter settings; while if the coefficient $\beta_i$ is a negative value, then the value corresponding to the upper limit of the feasible parameter range is taken as the optimal parameter settings. With respect to regression coefficients with a very small absolute value, it may be neglected in practice since they have little effect on the optimization target. Thus, for a case as illustrated in Tables 1 and 2, optimal parameter settings are given in Table 3, which are illustrated as bold and underlined

TABLE 3

Optimal Parameters Settings for Each Power Load Segment

| Power Load level | Percentile rank | Percentile of Adjustable Parameters | | | | | | |
|---|---|---|---|---|---|---|---|---|
| | | Oxygen | Main Steam Temperature | Main Steam Pressure | Reheat Steam Temperature | Reheat Steam Pressure | Vacuum | ... |
| 300 MW~320 MW | 25$^{th}$ | 6.68842 | 569.075 | 15.075 | 560.375 | 2 | −94.8 | ... |
| | 75$^{th}$ | 13.9857 | 570 | 15.4 | 564.025 | 2 | −93.3 | ... |
| 320 MW~340 MW | 25$^{th}$ | 6.31647 | 567.925 | 15.7 | 559.425 | 2 | −94.975 | ... |
| | 75$^{th}$ | 13.409 | 569.7 | 16.1 | 562.375 | 2.1 | −93.625 | ... |
| ... | ... | ... | ... | ... | ... | ... | ... | ... |

The correlations between the system energy efficiency and the relative parameters may also be obtained by other means. In another embodiment of the correlation between a determined parameters $x_i$ and optimization y is determined directly without using linear regression model. Only for a purpose of illustration, the correlation calculation based approach will be described hereinafter. Similarly, an optimization target, such as standard coal consumption rate, emission measurements, etc., may be selected as an optimization target and assigned as a dependent variable y, and related adjustable parameters may be assigned as independent variables $x_i$. Instead of establishing a linear regression model, the correlation between adjustable parameters $x_i$ and the optimization target y are determined directly $$\rho_{xi,y}=\text{corr}(x_i, y) \quad (2).$$

Based on the calculated correlation, the optimal parameter setting can be obtained. In an example in which the standard coal consumption rate is set as the dependent variable y and adjustable parameters are set as independent variables xi. The correlations are calculated and the example resulting correlations are listed in Table 4.

From Tables 3 and 5, it may be seen that the final Optimal Parameters Settings for Each Power Load Segment are different, as a result of applying the threshold of 0.1 in this example.

In order to achieve more accurate parameter settings, each power load power segment may be further shifted and steps S102 and S103 are repeatedly. In this way, more accurate parameter settings may be obtained. Hereinafter, description will be made to shift the power load segment with reference to FIG. 4.

In an embodiment of the present disclosure, the number of power load segment shifting may be set, for example as M. It may be appreciated that each power load segment contains approximately the same number of records and thus the number of shifting for each segment may be set as the same value M since, for a wide power load segment, a larger number of shifting may not improve the accuracy of parameter settings substantially because of limitation of the number of records. However, it should be noticed that it is also possible to set different number of shifting for each segment.

TABLE 4

Coefficients of Adjustable Parameters

| Power Load Segment | Coefficients of Adjustable Parameters | | | | | | |
|---|---|---|---|---|---|---|---|
| | Oxygen | Main Steam Temperature | Main Steam Pressure | Reheat Steam Temperature | Reheat Steam Pressure | Vacuum | ... |
| 300 MW~320 MW | 0.3638 | 0.0025 | 0.0357 | 0.0972 | −0.2298 | 0.1761 | ... |
| 320 MW~340 MW | 0.1244 | 0.2692 | −0.1832 | 0.1944 | −0.0647 | 0.0290 | ... |
| ... | ... | ... | ... | ... | ... | ... | ... |

As the optimization target is to get the lowest consumption rate, if the correlation has an absolute value greater than threshold (0.1), the lower percentile may be chosen as the targeted parameter value, and vice versa. In table 5, the bold and underlined values are chosen as the optimal parameter settings for the corresponding power load segment.

Based on the value of M, new power load segments after each segment shifting may be determined. For example, if M is set as 4, there will be four shifting involved. Thus, for segments 1 to 3, the shifting step may be 2; for segment 4, the shifting step may be set as 4; for segment 5, the shifting step may be set as 10, for segment 6, shifting may be

TABLE 5

Optimal Parameters Settings for Each Power Load Segment

Figure 4:
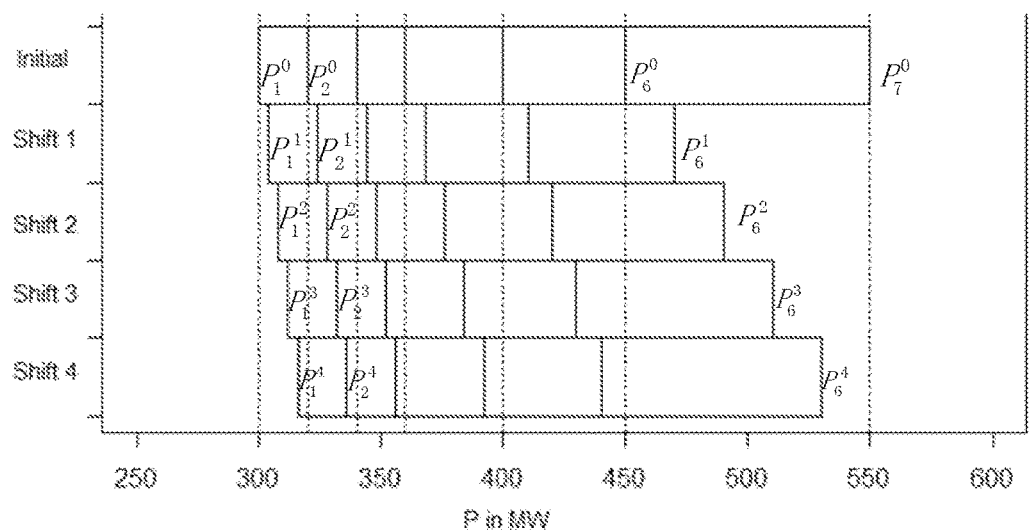
FIG. 4 schematically illustrates a diagram of segment shifting according to an embodiment of the present disclosure.

| Power Load level | Percentile rank | Percentile of Adjustable Parameters | | | | | | |
|---|---|---|---|---|---|---|---|---|
| | | Oxygen | Main Steam Temperature | Main Steam Pressure | Reheat Steam Temperature | Reheat Steam Pressure | Vacuum | ... |
| 300 MW~320 MW | 25$^{th}$ | 6.68842 | 569.075 | 15.075 | 560.375 | 2 | −94.8 | ... |
| | 75$^{th}$ | 13.9857 | 570 | 15.4 | 564.025 | 2 | −93.3 | ... |
| 320 MW~340 MW | 25$^{th}$ | 6.31647 | 567.925 | 15.7 | 559.425 | 2 | −94.975 | ... |
| | 75$^{th}$ | 13.409 | 569.7 | 16.1 | 562.375 | 2.1 | −93.625 | ... |
| ... | ... | ... | ... | ... | ... | ... | ... | ... | omitted, because, beyond 550 MW, there are only two records. FIG. 4 schematically illustrates the shifting of power load segments and the resulting power load segments after each shifting. From FIG. 4, it may be clearly seen that the power load segments are shifted each time by shifting the segment boundary of respective power load segments.

Thus, from six initial segments illustrated hereinbefore, the following new segments after each segment shifting can be obtained:

TABLE 4

New Segments After Each Shifting

|         | Segment 1  | Segment 2  | Segment 3  | Segment 4  | Segment 5  | Segment 6  |
|---------|------------|------------|------------|------------|------------|------------|
| Initial | [300,320)  | [320,340)  | [340,360)  | [360,400)  | [400,450)  | [450,550)  |
| Shift 1 | [304,324)  | [324,344)  | [344,368)  | [368,410)  | [410,470)  |            |
| Shift 2 | [308,328)  | [328,348)  | [348,376)  | [376,420)  | [420,490)  |            |
| Shift 3 | [312,332)  | [332,352)  | [352,384)  | [384,430)  | [430,510)  |            |
| Shift 4 | [316,336)  | [336,356)  | [356,392)  | [392,440)  | [440,530)  |            |

Figure 5A:
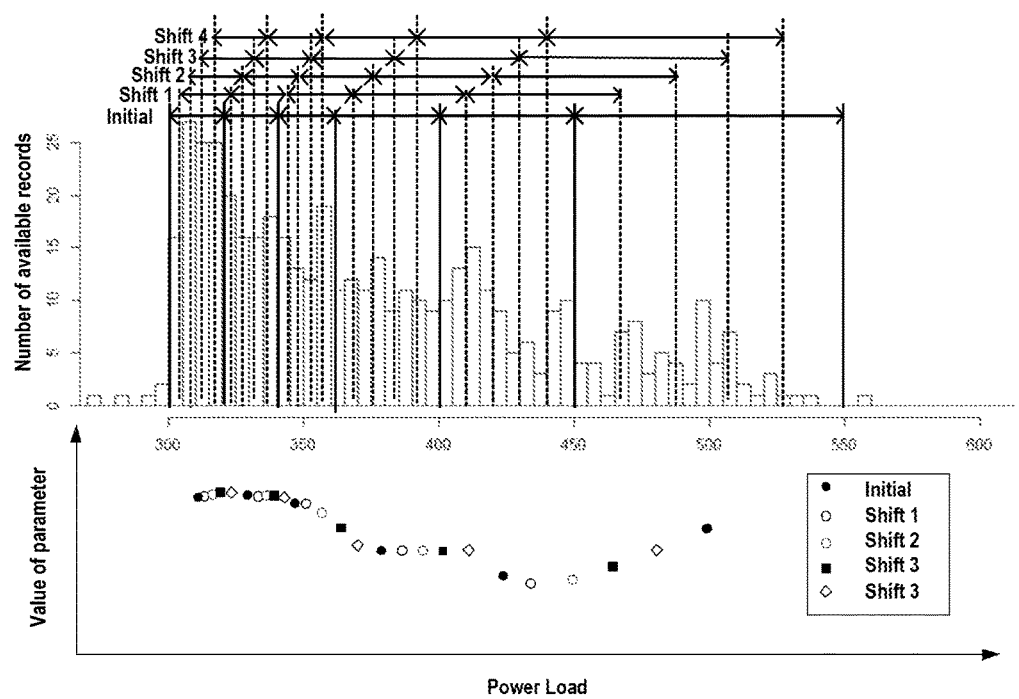
FIGS. 5A to 5C schematically illustrate a diagram of forming optimal parameter setting curve according to an embodiment of the present disclosure.

Steps S102 and 103 may be further performed on these new segments obtained by shifting and in such a way, a plurality of parameter settings for each parameter may be determined, which is illustrated in FIG. 5A.

Figure 5B:
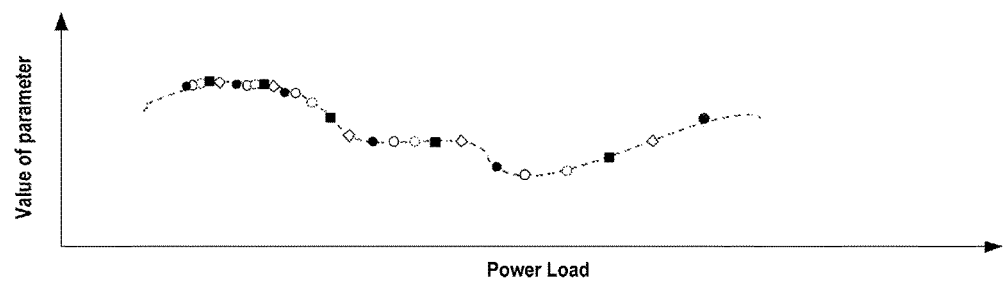
Figure 5C:
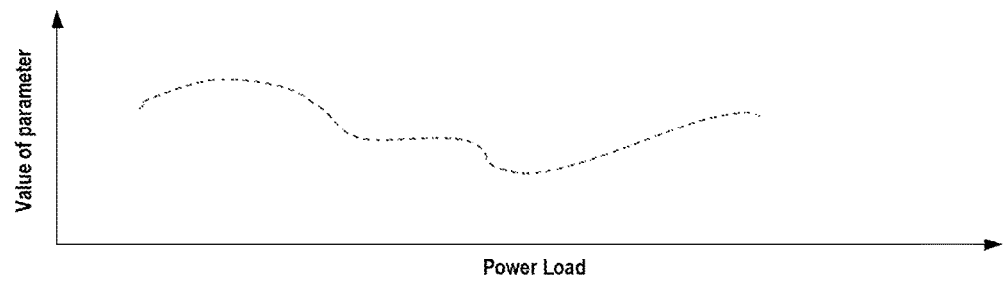

In an embodiment of the present disclosure, an optimal parameter setting curve for each of the parameters may be further formed based on the determined optimal parameter settings for each of the plurality of power load segments by means of, for example, interpolation or other curve fitting approaches, which is illustrated in FIG. 5B. The final resulting optimal parameter setting curve is illustrated in FIG. 5C, only for a purpose of illustration. It may be possible to obtain different parameter setting curves for adjustable parameters of the power generation system. With these curves, optimal parameter setting for different operation conditions may be determined.

Accordingly, with embodiments of the present disclosure, for any of power generation systems, especially various coal-fired power generation systems, optimal parameter settings for different load conditions may be determined automatically from historical load data. The present disclosure therefore provides a highly adaptive solution for determining parameter settings instead of an equipment specific solution. Essentially, the solution proposed in the present disclosure can be applied to various types of power plants as well as different load conditions.

There is also provided a system for determining parameter settings for a power generation system, and hereinbelow this system will be described with reference to FIG. 6, which schematically illustrates a block diagram of a system for determining parameter settings in power generation system according to an embodiment of the present disclosure.

Figure 6:
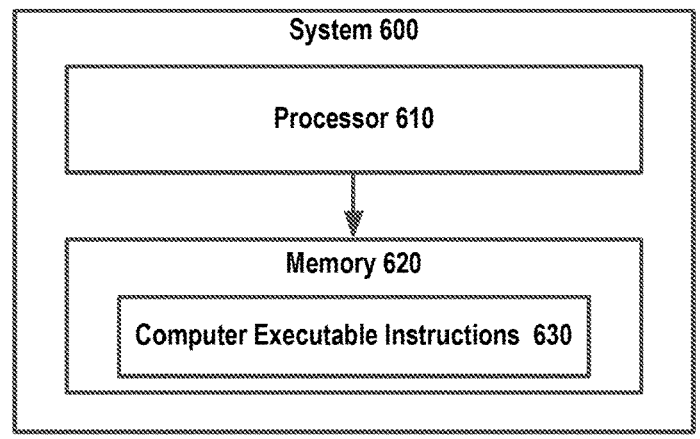
FIG. 6 schematically illustrates a block diagram of a system for determining parameter settings in power generation system according to an embodiment of the present disclosure.

As illustrated in FIG. 6, the system 600 comprises at least one processor 610; and at least one memory 620 storing computer executable instructions 630. The at least one memory 620 and the computer executable instructions 630 configured to, with the at least one processor 610, cause the system 600 to: divide historical power related data of the power generation system into a plurality of power load segments based on typical power load values and the number of the historical power related data; identify feasible parameter ranges for each of the plurality of power load segments; and determine optimal parameter settings for each of the plurality of power load segments, based on the identified feasible parameters ranges and correlations between system energy efficiency and relative parameters of each of the plurality of power load segments.

In an embodiment of the present disclosure, the system may be further configured to shift the power load segments by shifting segment boundary of the power load segments by a predetermined number, and perform the identifying feasible parameter ranges and the determining optimal parameters settings for each of the shifted power load segments.

In another embodiment of the present disclosure, the system may be further configured to form an optimal parameter setting curve for each of parameters based on the determined optimal parameter settings for each of the plurality of power load segments by means of interpolation.

In a further embodiment of the present disclosure, the dividing historical power related data into a plurality of power load segments may comprise setting segment boundaries based on typical power load values and the number of the historical power related data; and identifying, from the historical power related data, power related data within segment boundaries of the plurality of power load segments respectively.

In a still further embodiment of the present disclosure, each of the feasible parameter ranges may be determined as between a value corresponding to a predetermined lower percentile rank in power related data of respective power load segments and a value corresponding to a predetermined higher percentile rank in power related data of respective power load segments.

In a yet further embodiment of the present disclosure, the correlation between relative parameters and system energy efficiency may be found by establishing, for each of the plurality of the power load segments, a linear regression module between the system energy efficiency and the relative parameters; and determining regression coefficients of the linear regression module based on the power related data of the each of the plurality of power load segments, which regression coefficients indicate effect of relative parameters on the system energy efficiency.

In a still yet further embodiment of the present disclosure, the system may be further configured to pre-process power related records from various data sources to obtain the historical power related data used for segmentation.

Figure 7:
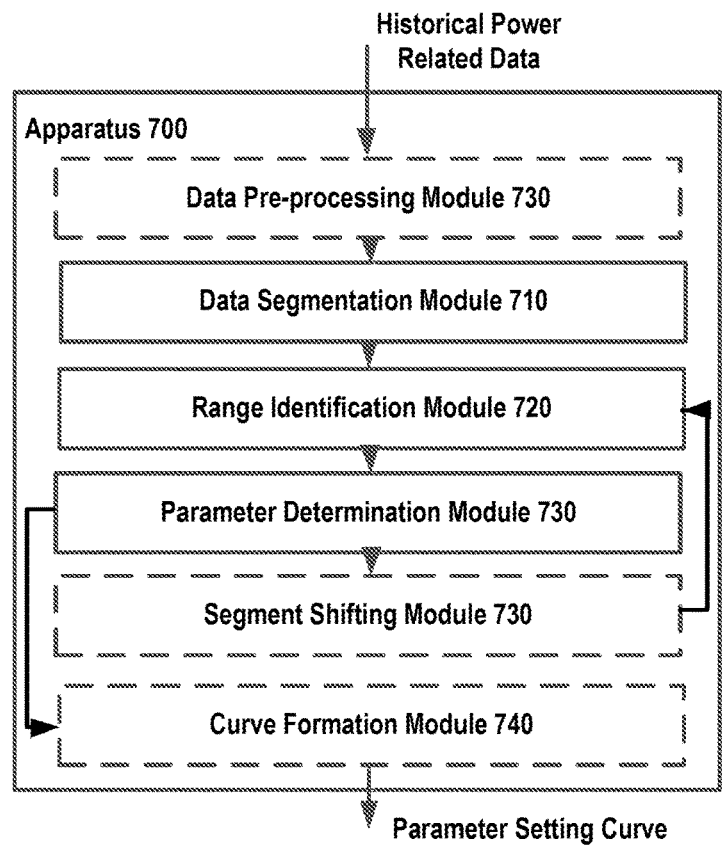
FIG. 7 schematically illustrates a block diagram of an apparatus for determining parameter settings in power generation system according to an embodiment of the present disclosure.

In FIG. 7, there is illustrated an apparatus for determining parameter settings for a power generation system according to an embodiment of the present disclosure. The apparatus 700 comprises: a data segmentation module 710 a range identification module 720, and a parameter determination module 730. The data segmentation module 710 configured to divide historical power related data of the power generation system into a plurality of power load segments based on typical power load values and the number of the historical power related data. The range identification module 720 configured to identify feasible parameter ranges for each of the plurality of power load segments. The parameter determination module 730 configured to determine optimal parameter settings for each the plurality of power load segments based on the identified feasible parameters ranges and correlations between respective parameters and energy efficiency.

In an embodiment of the present disclosure, the apparatus 700 may further comprise a segment shifting module 740 which may be configured to shift the power load segments by shifting segment boundary of the power load segments by a predetermined number. In such a case, the range identification module 720 and the parameter determination module 730 may be further configured to perform the identifying feasible parameter ranges and the determining optimal parameters settings for each of the shifted power load segments.

In another embodiment of the present disclosure, the apparatus 700 may further comprise a curve formation module 750, which may be configured to form an optimal parameter setting curve for each of parameters based on the determined optimal parameter settings for each of the plurality of power load segments by means of interpolation.

Besides, the apparatus 700 may further comprise a data pre-processing module 760, which may be configured to pre-process power related records from various data sources to obtain the historical power related data used for segmentations.

Figure 8:
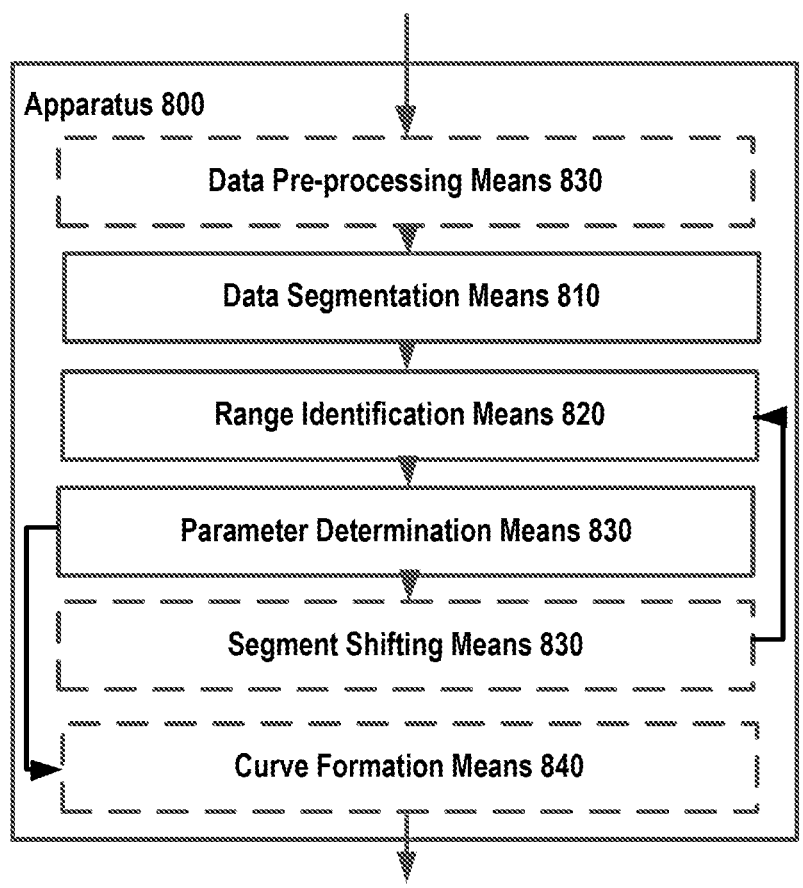
FIG. 8 schematically illustrates a block diagram of an apparatus for determining parameter settings in power generation system according to another embodiment of the present disclosure.

In FIG. 8, there is further illustrated an apparatus for determining parameter settings for a power generation system. The apparatus 800 comprises: means 810 for dividing historical power related data of the power generation system into a plurality of power load segments based on typical power load values and the number of the historical power related data; means 820 for identifying feasible parameter ranges for each of the plurality of power load segments; and means 830 for determining optimal parameter settings for each the plurality of power load segments based on the identified feasible parameters ranges and correlations between respective parameters and energy efficiency.

As illustrated in FIG. 8, the apparatus 800 may additionally comprise a segment shifting means 840 which may be configured to shift the power load segments by shifting segment boundary of the power load segments by a predetermined number. In such a case, the range identification means 820 and the parameter determination means 830 may be further configured to perform the identifying feasible parameter ranges and the determining optimal parameters settings for each of the shifted power load segments.

Besides, the apparatus 800 may further comprise a curve formation mean 850, which may be configured to form an optimal parameter setting curve for each parameter based on the determined optimal parameter settings for each of the plurality of power load segments by means of interpolation.

In addition, the apparatus 800 may also include a data pre-processing means 860, which may be configured to pre-process power related records from various data sources to obtain the historical power related data used for segmentations.

Furthermore, there is provided a tangible computer-readable medium having a plurality of instructions executable by a processor to manage loads of a power grid, the tangible computer-readable medium may comprise instructions configured to perform steps of the method according to any embodiments of method of the present disclosure.

It should be noted that operations of respective modules or means as comprised in the system 600, apparatus 700, and apparatus 800 substantially correspond to respective method steps as previously described. Therefore, for detailed operations of respective modules or means in the system 600, apparatus 700, and apparatus 800, please refer to the previous descriptions of the methods of the present disclosure with reference to FIGS. 1 to 5.

Besides, although hereinbefore specific embodiments are presented, they are only given for a purpose of illustration so as to enable the skilled in the art to understanding the idea of the present disclosure completely and thoroughly so that they can practice the solution of the present disclosure. From the teaching as provided herein, the skilled in the art can conceive various modifications; all these modifications should be fallen within the scope of the appendix claims. For example, although the solution is described as applicable to coal-fired power generation system, and in fact, it may be used in any other power generation system with similar problems. Besides, to obtain the correlation between the energy efficiency and relative parameters, approaches based on linear regression module and correlation calculations are described; however, the present disclosure is not limited thereto, any other suitable approaches suitable for obtain correlation between the energy efficiency and relative parameters can also be used.

Figure 9:
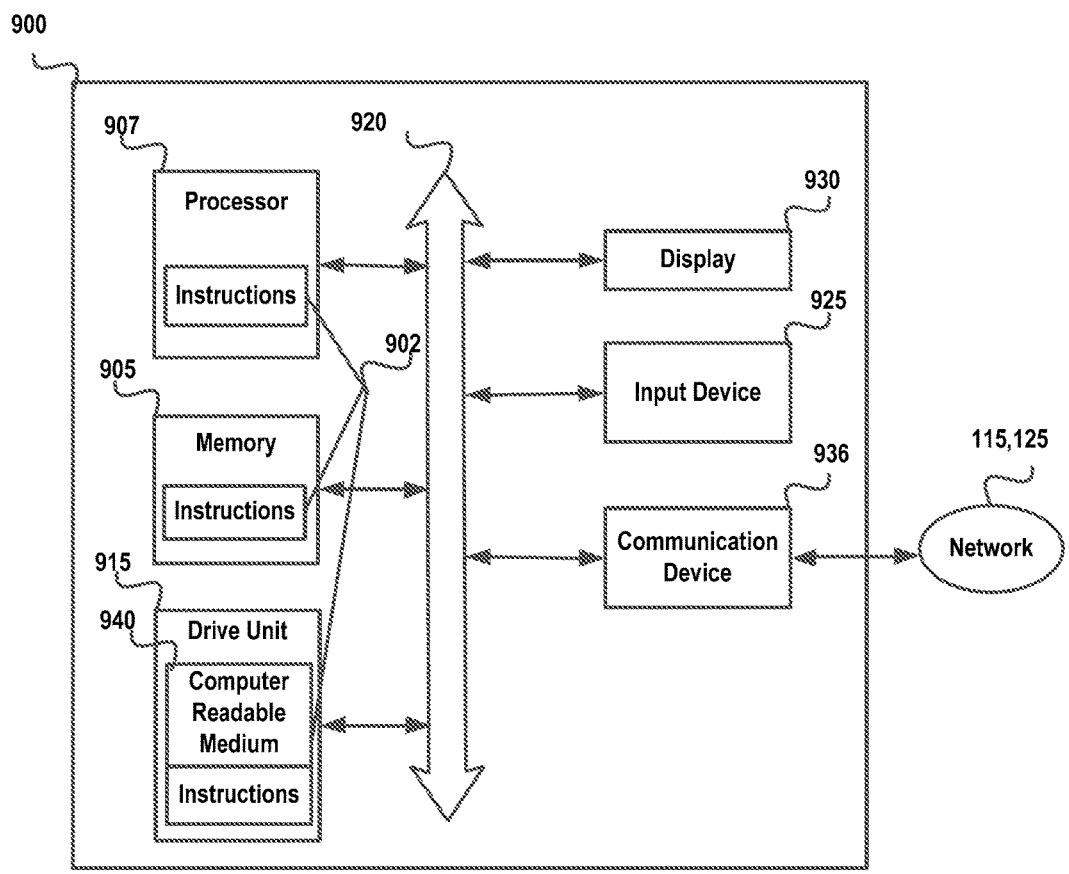
FIG. 9 schematically illustrates schematically illustrates a general computer system, programmable to be a specific computer system, which may represent any of the computing devices referenced herein.

In FIG. 9 is further illustrated a general computer system 900, which may represent any of the computing devices referenced herein. For instance, the general computer system 900 may represent—in part or in its entirety—the control center, the head end, the integrated network operations and management system (NOMS), the fault, performance, and configuration management (FPCM) module, or any other computing devices referenced herein such as the end devices, the meters, the telemetry interface modules (TIUs), the collectors, and/or any networked components such as routers, switches or servers as discussed herein. The computer system 900 may include an ordered listing of a set of instructions 902 that may be executed to cause the computer system 900 to perform any one or more of the methods or computer-based functions disclosed herein. The computer system 900 may operate as a stand-alone device or may be connected, e.g., using the network 115, 125, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile computing device capable of executing a set of instructions 902 that specify actions to be taken by that machine, including and not limited to, accessing the network 115, 125 through any form of browser. Further, each of the systems described may include any collection of sub-systems that individually or jointly execute a set, or multiple sets, of instructions to perform one or more computer functions.

The computer system 900 may include a processor 907, such as a central processing module (CPU) and/or a graphics processing module (GPU). The processor 907 may include one or more general processors, digital signal processors, application specific integrated circuits, field programmable gate arrays, digital circuits, optical circuits, analog circuits, combinations thereof, or other now known or later-developed devices for analyzing and processing data. The processor 907 may implement the set of instructions 902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 900 may include a memory 905 on a bus 920 for communicating information. Code operable to cause the computer system to perform any of the acts or operations described herein may be stored in the memory 905. The memory 905 may be a random-access memory, read-only memory, programmable memory, hard disk drive or any other type of volatile or non-volatile memory or storage device.

The computer system 900 may also include a disk, solid-state drive optical drive module 915. The disk drive module 915 may include a non-transitory or tangible computer-readable medium 940 in which one or more sets of instructions 902, e.g., software, can be embedded. Further, the instructions 902 may perform one or more of the operations as described herein. The instructions 902 may reside completely, or at least partially, within the memory 905 and/or within the processor 907 during execution by the computer system 900. The database or any other databases described above may be stored in the memory 905 and/or the disk module 915.

The memory 905 and the processor 907 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 900 may include an input device 925, such as a keyboard or mouse, configured for a user to interact with any of the components of system 900, including user selections or menu entries of display menus. It may further include a display 930, such as a liquid crystal display (LCD), a cathode ray tube (CRT), or any other display suitable for conveying information. The display 930 may act as an interface for the user to see the functioning of the processor 907, or specifically as an interface with the software stored in the memory 905 or the drive module 915.

The computer system 900 may include a communication interface 936 that enables communications via the communications network 125. The network 125 may include wired networks, wireless networks, or combinations thereof. The communication interface 936 networks may enable communications via any number of communication standards, such as Ethernet AVB, 802.11, 802.13, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 907. Software modules may include instructions stored in the memory 905, or other memory device, that are executable by the processor 907 or other processors. Hardware modules may include various devices, components, circuits, gates, circuit boards, and the like that are executable, directed, and/or controlled for performance by the processor 907.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A system for determining parameter settings for a power generation system, the system comprising:
   at least one processor; and
   at least one memory storing computer executable instructions, the at least one memory being non-transitory;
   wherein the at least one memory and the computer executable instructions are configured to, with the at least one processor, cause the power generation system to:

divide historical power related data of the power generation system into each of a plurality of power load segments based on power load values and a quantity of respective historical power related data within each of the power load segments, the power load values based on variable load levels being supplied by the power generation system;

identify parameter ranges for each of the plurality of power load segments;

determine an adjustment of the parameter settings for operational parameters within the power generation system for each of the plurality of power load segments, based on the identified parameters ranges and correlations between system energy efficiency and corresponding adjustable parameters of each of the plurality of power load segments; and apply the parameter settings to the power generation system to control operating efficiency of equipment included in the power generation system in accordance with the variable load level.

2. The system according to claim 1, wherein the at least one memory and the computer executable instructions are further configured to, with the at least one processor, cause the system to:

shift the power load segments by shifting a segment boundary of each of the power load segments by a predetermined number, and perform identification of the parameter ranges and determination of the adjustment of parameter settings for each of the shifted power load segments.

3. The system according to claim 1, wherein the at least one memory and the computer executable instructions are further configured to, with the at least one processor, cause the system to:

form an optimal parameter setting curve for each parameter based on the determined parameter settings for each of the plurality of power load segments by means of interpolation.

4. The system according to claim 1, wherein the division of the historical power related data into the plurality of power load segments comprises computer executable instructions configured to, with the at least one processor, cause the system to:

set segment boundaries based on typical power load values and the quantity of the historical power related data; and identify, from the historical power related data, power related data within segment boundaries of respective power load segments.

5. The system according to claim 1, wherein each of the parameter ranges is determined as between a value corresponding to a predetermined lower percentile rank in power related data of respective power load segments and a value corresponding to a predetermined higher percentile rank in power related data of each of the respective power load segments.

6. The system according to claim 1, wherein the correlations between corresponding adjustable parameters and system energy efficiency of each of the plurality of power load segments are found by computer executable instructions configured to, with the at least one processor, cause the system to:

establish, for each of the plurality of power load segments, a linear regression model between the system energy efficiency and the corresponding adjustable parameters; and determine regression coefficients of the linear regression model based on power related data of the each of the plurality of power load segments, wherein the regression coefficients indicate an effect of the corresponding adjustable parameters on the system energy efficiency.

7. The system according to claim 1, wherein the at least one memory and the computer executable instructions are further configured to, with the at least one processor, cause the system to:

pre-process power related records from various data sources to obtain the historical power related data used for segmentation.

8. A method for determining parameter settings for a power generation system, comprising:

dividing historical power related data of the power generation system into a plurality of power load segments based on power load values and a quantity of the historical power related data in each of the power load segments, the power load values based on a varying load level being supplied by the power generation system;

identifying parameter ranges for each of the plurality of power load segments;

determining an adjustment of parameter settings for operational parameters within the power generation system for each of the plurality of power load segments, based on the identified parameters ranges and correlations between system energy efficiency and corresponding adjustable parameters of each of the plurality of power load segments; and applying the parameter settings to the power generation system to control operating efficiency of equipment included in the power generation system in accordance with the varying load level.

9. The method according to claim 8, further comprising shifting the power load segments by shifting a segment boundary of the power load segments by a predetermined number, and wherein the step of identifying parameter ranges and the step of determining parameters settings are performed for each of the shifted power load segments.

10. The method according to claim 8, further comprising forming, by means of interpolation, a parameter setting curve for each of a plurality of parameters of a power load segment based on the determined parameter settings for each of the plurality of power load segments.

11. The method according to claim 8, wherein the step of dividing historical power related data into a plurality of power load segments comprises:

setting segment boundaries for each of the power load segments based on typical power load values and the quantity of the historical power related data included in respective power load segments; and identifying, from the historical power related data, power related data within segment boundaries of the respective power load segments.

12. The method according to claim 8, wherein each of the parameter ranges is determined as between a value corresponding to a predetermined lower percentile rank in power related data of respective power load segments and a value corresponding to a predetermined higher percentile rank in power related data of respective power load segments.

13. The method according to claim 8, wherein the correlation between the energy efficiency and the corresponding adjustable parameters of each of the plurality of power load segments is found by:

establishing with a linear regression model a correlation between the energy efficiency and the corresponding adjustable parameters; and determining regression coefficients of the linear regression model based on the power related data of the each of the plurality of power load segments, wherein the regression coefficients indicate an effect of the corresponding adjustable parameters on the system energy efficiency.

14. The method according to claim 8, further comprising pre-processing power related records from various data sources to obtain the historical power related data used for segmentation.

15. An apparatus for determining parameter settings for a power generation system, comprising:

a processor configured to divide historical power related data of the power generation system into a plurality of power load segments based on typical power load values and an amount of the historical power related data included in each of the power load segments, the power load values based on a varying load level being supplied by the power generation system;

the processor further configured to identify parameter ranges for each of the plurality of power load segments;

the processor further configured to determine an adjustment of parameter settings for equipment within the power generation system for each of the plurality of power load segments, based on the identified parameters ranges and correlations between system energy efficiency and corresponding adjustable parameters of each of the plurality of power load segments, and the processor further configured to apply the parameter settings to the power generation system to control operating efficiency of equipment included in the power generation system in accordance with the varying load level.

16. A non-transitory computer-readable medium having a plurality of instructions executable by a processor to determine parameter settings for a power generation system, the non-transitory computer-readable medium comprises instructions configured to perform steps of the method according to claim 8.

* * * * *